United States Patent [19]

Dujardin et al.

[11] Patent Number: 5,140,066
[45] Date of Patent: Aug. 18, 1992

[54] POLY (METH)ACRYLATES WITH GRAFTED-ON POLYCARBONATE CHAINS, THEIR PRODUCTION AND USE

[75] Inventors: Ralf Dujardin, Krefeld; Leo Morbitzer, Cologne; Rolf Dhein, Krefeld; Werner Nouvertné, Krefeld, all of Fed. Rep. of Germany

[73] Assignee: Bayer Aktiengesellschaft, Leverkusen, Fed. Rep. of Germany

[21] Appl. No.: 504,509

[22] Filed: Apr. 3, 1990

[30] Foreign Application Priority Data

Apr. 7, 1989 [DE] Fed. Rep. of Germany ....... 3911222

[51] Int. Cl.$^5$ .................... C08L 69/00; C08G 64/18
[52] U.S. Cl. ..................... 525/69; 525/147; 525/148; 525/468
[58] Field of Search ............. 525/69, 147, 148

[56] References Cited

U.S. PATENT DOCUMENTS

| 3,431,224 | 3/1969 | Goldblum | 260/13 |
| 3,687,895 | 8/1972 | Vernaleken et al. | 260/47 UA |
| 3,717,172 | 2/1973 | Dailey et al. | 137/561 |
| 3,758,597 | 9/1973 | Buysch et al. | 260/613 R |
| 3,856,886 | 12/1974 | Margotte et al. | 260/873 |
| 3,991,009 | 11/1976 | Margotte et al. | 260/42.18 |
| 4,374,816 | 10/1989 | Dujardin et al. | 525/146 |
| 4,481,331 | 11/1984 | Liu | 525/92 |
| 4,617,345 | 10/1986 | Sederel | 525/67 |

FOREIGN PATENT DOCUMENTS 1153527   8/1963   Fed. Rep. of Germany .

OTHER PUBLICATIONS

Angewandte Mak. Chemie 1977 –pp. 125–137 –No. 861.

Primary Examiner—James J. Seidleck
Assistant Examiner—David Buttner
Attorney, Agent, or Firm—Joseph C. Gil; Aron Preis

[57] ABSTRACT

The invention relates to poly(meth)acrylates having grafted-on polycarbonate chains, to their production and to their use as modifiers for thermoplastic polycarbonates having improved resistance to gasoline and/or improved impact strength at low temperatures and to their production.

5 Claims, No Drawings

POLY (METH)ACRYLATES WITH GRAFTED-ON POLYCARBONATE CHAINS, THEIR PRODUCTION AND USE

This invention relates to a process for the production of vinyl copolymers having grafted-on polycarbonate chains, of which the vinyl copolymer graft base has an Mn (number average molecular weight, as determined by gel permeation chromatography) in the range from 10,000 to 40,000, of which the polycarbonate chains have a degree of polycondensation of recurring carbonate structural units of from 35 to 70 and in which the ratio by weight of vinyl copolymer graft base to grafted-on polycarbonate chains is between 35% by weight : 65% by weight and 55% by weight : 45% by weight, characterized in that from 95 mol-% to 99.5 mol-% (meth)acrylates and from 5 mol-% to 0.5 mol-% compounds corresponding to formula (I)

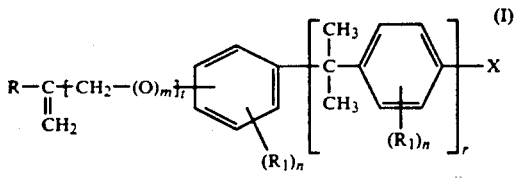

in which
R = H or $C_{1-4}$ alkyl,
$R_1$ = Cl, Br, $C_{1-4}$ alkyl, cyclohexyl or $C_{1-4}$ alkoxy,
m = 0 or 1,
n = 0, 1 or 2,
r = 0 or 1,
t = 0 or 1 and
X = —O—Si(CH$_3$)$_3$, are copolymerized by radically initiated polymerization in known manner to a desired molecular weight (Mn, number average molecular weight) in the range from 10,000 to 40,000, after which the polymer is reacted as such, i.e. without isolation, with diphenols, phosgene and monophenols in aqueous-alkaline phase in the presence of an inert organic solvent under the conditions of the two-phase interfacial process, the quantity of diphenol being selected so that the content of polycarbonate chains in the grafted vinyl copolymer is between 65% and 45% by weight, based on the total weight of the grafted vinyl copolymer, including grafted-on polycarbonate chains, the quantity of chain terminator being gauged in such a way that the average chain length of the grafted-on polycarbonate side chains comprises between 35 and 70 recurring carbonate structural units and the quantity of inert organic solvent having to the gauged in such a way that the final viscosity of the organic phase of the reaction mixture is between 5 and 25 mPa.s and preferably between 10 and 20 mPa.s.

In the context of the invention, the final viscosity is understood to be the absolute viscosity of the organic phase of the reaction mixture on completion of polycondensation at 20° C., as determined with a Hoppler viscosimeter.

The present invention also relates to the grafted vinyl copolymers obtainable by the process according to the invention.

A process for the production of copolymers containing phenol radicals as side chains from unsaturated phenols and other olefinic compounds is known from DE-AS 1 153 527. The copolymerization takes place in the presence of Lewis acids or acids having a similar effect, i.e. is ionically catalyzed. The products obtained have average molecular weights in the range from about 500 to 2,000.

The production of corresponding vinyl copolymers is also known from DE-OS 1 770 144, DE-OS 1 795 840 and U.S. Pat. No. 3,687,895. The copolymerization may be both ionically and radically catalyzed (page 4 of DE-OS 1 770 144).

According to formula II on page 3 of DE-OS 1 770 144, the molecular weights (number averages) Mn may be between about 3,000 (1=5 and r,=5) and about 20,000,000 (1=200 and r=1,000), although an Mn (number average molecular weight) of 52,000 is reached in Example M$_1$, the only Example with a methyl methacrylate (cf. the amended version of DE-AS 1 770 144, column 7). In addition, the grafted on polycarbonate chains reach a degree of polymerization of only 16.2 in the corresponding Example 11 of DE-AS 1 770 144, whereas according to formula I of DE-AS 1 770 144 a degree of polymerization in the range from 5 to 100 is possible.

In other words, although the grafted vinyl copolymers according to the present invention fall within the general formula of DE-AS 1 770 144 or U.S. Pat. No. 3,687,895, the required criteria, namely Mn of the graft base in the range from 10,000 to 40,000, recurring carbonate structural units of 35 to 70 in the side chains and ratios by weight of polycarbonate chains to graft base of 65% by weight : 25% by weight to 45% by weight : 55% by weight are never specifically disclosed together in the patent specification. At least one of these criteria is never satisfied.

Corresponding vinyl copolymers having average molecular weights Mn (number average) in the range from 10,000 to 200,000 and preferably in the range from 20,000 to 50,000 (column 2, lines 10 to 16 of U.S. Pat. No. 3,856,886) are also known from U.S. Pat. No. 3,856,886. Polycarbonates are also grafted onto these vinyl copolymers, reference being made to the already cited U.S. Pat. No. 3,687,895. Once again, although the grafted vinyl copolymers according to the present invention fall within the general formula of U.S. Pat. No. 3,856,886, the required criteria are never specifically disclosed together in the patent specification. At least one of these criteria is never satisfied.

According to U.S. Pat. No. 3,856,886, grafted vinyl copolymers are mixed with vinyl polymers and/or thermoplastic polycarbonates.

Now, it can be seen from Examples 8 to 15 of this U.S. Pat. that, for the mixtures with thermoplastic polycarbonates, the graft base of the grafted vinyl polymer is between 10 and 30% by weight.

The mixtures of the grafted vinyl copolymers with thermoplastic polycarbonates show improved alkali and hot water resistance, improved mechanical properties and no signs of incompatibility (column 6, lines 47 to 61 of U.S. Pat. No. 3,856,886 and pages ⅔ of DE-OS 2 019 994).

Finally, copolymers containing phenol radicals as side chains are known from DE-OS 1 950 982 and from U.S. Pat. No. 3,758,597. The molecular weights of these vinyl copolymer graft bases are not mentioned. In addition, the grafting on of polycarbonate chains is described, the content of graft base in the grafted product of the only Example being 5% by weight.

Corresponding grafted vinyl copolymers are also known from DE-OS 2 357 192 and the corresponding U.S. Pat. No. 3,991,009. The ungrafted copolymers are said to have a molecular weight (Mw, as determined by osmosis) in the range from 10,000 to 100,000 and preferably in the range from 10,000 to 40,000. The grafted vinyl copolymers described in the Examples contain 10% by weight or 20% by weight copolymer base.

Finally, polycarbonate-grafted polyvinyl compounds are described in "Angewandte Makromolekulare Chemie", 60/61 (1977), pages 125 to 137 (No. 861). However, the Mn of the graft base is again only in the range from 2,000 to 4,000 and the content of graft base in the graft vinyl polymer at most 20% by weight.

However, one disadvantage of molding compounds of this type is their inadequate resistance to fuels (gasoline) or other organic solvents.

To obtain resistance to gasoline and high notched impact strength of polycarbonate molding compounds, special block copolymers (Kraton ®G) and either copolymers of olefins with acrylates (cf EP-P 0 119 533) or with coreshell graft copolymers (cf. EP-OS 0 173 358) are used.

A combination of the special block copolymer mentioned with olefin acrylate copolymers or olefin-diene terpolymers is used for mixtures of copolyester carbonates with polycarbonates (cf. EP-OS 0 186 825). However, the addition of the special block copolymers can lead to problems with the quality of the molding compounds in the form of delamination and reduced toughness at low temperatures.

Another method of producing polycarbonate molding compounds combining high impact strength with surface resistance to gasoline and other fuels is to combine the polycarbonates with polyalkylene terephthalates to which polymers are added (cf. DE-OS 3 302 124, page 27, paragraph 3 and EP-OS 0 131 196 (Le A 22 440), page 12, last paragraph), the addition of nitrile rubbers to polycarbonates in accordance with EP-OS 0 131 196 improving resistance to gasoline, even without the addition of polyesters.

By contrast, it has now been found that the grafted vinyl polymers obtainable by the process according to the invention, of which the graft base has an Mn in the range from 10,000 to 40,000 and preferably in the range from 12,000 to 35,000 and a content of 0.5 to 1 mol-% compounds corresponding to general formula I, in which the content of graft base is between 35% by weight and 65% by weight, based on the total weight of grafted vinyl copolymer, including grafted-on polycarbonate chains, and of which the polycarbonate chains have a degree of polycondensation of recurring carbonate structural units of 35 to 70, are excellent additives for improving the resistance of polycarbonate to gasoline and, with contents of 1 to 5 mol-% compounds corresponding to general formula I, represent excellent impact modifiers for polycarbonate.

It was not obvious to the expert that, simply by variation of the constant ratio by weight between graft base and polycarbonate side chains, the graft copolymers would induce either high gasoline resistance or high low-temperature toughness in polycarbonate.

Vinyl copolymers containing grafted-on polycarbonate chains which have polystyrenes as the graft base and which make mixtures of polycarbonates with polystyrenes more compatible are known from DE-OS 3 717 172 (Le A 25 000).

Graft copolymers of styrene resins and aromatic polycarbonates which are particularly suitable for optical articles are known from EP-OS 0 293 908.

Accordingly, the present invention also relates to the use of the grafted vinyl copolymers obtainable by the process according to the invention as modifiers for thermoplastic polycarbonates.

It is known that high molecular weight polycarbonates show excellent impact strength up to a critical thickness of 6.35 mm. Beyond this limit, their impact strength is poor. In addition, the impact strength of the polycarbonate resins rapidly decreases with decreasing temperature and also at elevated temperatures.

The improvement in the impact strength of polycarbonate resins at low temperature and at room temperature, hereinafter referred to as low-temperature toughness, is achieved by the use of so-called impact modifiers, including polyolefins (U.S. Pat. No. 3,431,224), butadiene-containing polymers (U.S. Pat. No. 3,880,783) and acrylate-containing polymers (U.S. Pat. No. 4,229,928).

The preferred acrylate polymers are multiphase systems consisting of a rubber-like first phase (core) and an adjoining thermoplastic hard phase (shell).

Thus, according to EP 0 036 127 (Mo 2062) for example, the improved impact strength of polycarbonate is achieved by the use in quantities of 1 to 20% by weight of a multiphase core-shell polymer based on an elastomeric phase of a $C_{1-5}$ alkyl acrylate polymer, for example butyl acrylate, which was crosslinked with a bifunctional acrylate monomer and which, after treatment with a grafting monomer, was introduced into the synthesis of the thermoplastic, hard phase consisting of methyl methacrylate.

The present invention also relates to mixtures containing thermoplastic polycarbonates and the vinyl copolymers grafted in accordance with the invention. These mixtures are suitable for the production of polycarbonate molding compounds showing resistance to gasoline and/or toughness at low temperatures.

The present invention also relates to mixtures containing A) 99.5 to 70% by weight, preferably 99 to 88% by weight and more preferably 98 to 91% by weight of a thermoplastic, aromatic polycarbonate based on diphenols corresponding to formula (II)

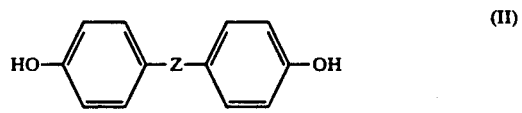

(II)

in which Z is a single bond, an alkylene radical containing 1 to 8 carbon atoms, an alkylidene radical containing 2 to 12 carbon atoms, a cyclohexylidene radical, a 3,3,5-tri-methyl cyclohexylidene radical according to P 38 32 396.6 (Le A 26 344), a benzylidene radical, a methyl benzylidene radical, a bis-(phenyl)-methylene radical, —S—, —SO$_2$—, —CO— or —O—, having Mw's (weight average molecular weights as determined in known manner via the relative solution viscosity) in the range from 15,000 to 120,000, preferably in the range from 20,000 to 80,000 and more preferably in the range from 25,000 to 45,000 and B) 0.5% by weight to 30% by weight, preferably 1.0% by weight to 12% by weight and more preferably 2% by weight to 9% by weight, based on 100% by weight of A) +B), of grafted vinyl copolymer obtainable in accordance with the invention; the quantity of grafted vinyl copolymer may also be the sum total of the quantity of two vinyl copolymers differing in their content of compounds corresponding to general formula (I).

The compounds corresponding to formula (I) required for the production of the grafted vinyl copolymers according to the invention of component B) are either known or may be produced by known methods (cf. for example H. Niederprüm, P. Voss, V. Beyl, Liebigs Ann., 1973, 20–32 and Japan Kkai Tokyo Koko 79/122 257).

Examples of compounds such as these are, for example, 3-trimethylsiloxystyrene, 4-trimethylsiloxystyrene, 3-tri-methylsilyloxy-α-methylstyrene,4-trimethylsiloxy-α-methyl-styrene, 2-methyl-4'-trimethylsiloxystyrene, 2-methyl-4-trimethylsiloxy-α-methylstyrene, 2,6-dichloro-4-trimethyl-siloxy-α-methylstyrene, 3-trimethylsiloxyallylbenzene, 4-trimethylsiloxyallkylbenzene and 4-trimethylsiloxyphenyl allylether.

One method of preparing the compounds corresponding to formula (I) is to react the corresponding phenols (Ia), which correspond to the compounds of formula (I), but in which X=OH, with hexamethyl disilazane at a temperature of 152° C. (H. Niederprüm, P. Voss, V. Beyl, Liebigs Ann., 1973. 20–32).

The graft bases of 95–99.5 mol-% (meth)acrylate and 0.5–5 mol-% compounds corresponding to general formula (I) are prepared by known methods of radical solution polymerization (G. Markert in Houben-Weyl, Methoden der org. Chemie, pages 1156 et seq., Thieme Verlag 1986). The solvent may be selected according to literature data (0. Fuchs and H.-H. Suhr in J. Brandup and E.H. Immergut, Polymer Handbook, pages IV-241 et seq., Wiley, NY 1975). Esters (for example ethyl acetate), aromatic solvents (for example toluene) and ketones (for example butanone) are generally preferred. The particularly preferred solvent for the preparation of the vinyl copolymer graft bases is chlorobenzene.

To obtain polymers having weight average molecular weights in the range from 20,000 to 200,000, it is generally sufficient to vary the concentration of monomer and initiator. If still necessary, aliphatic thiols (for example dodecyl mercaptan) having transfer constants of approximately 0.5 may be used as transfer regulators.

Typical initiators are diacyl peroxides (for example dibenzoyl peroxide), tert.-butyl esters of percarboxylic acids (for example perbenzoic acid) and derivatives of azo-bis-isobutyric acid (for example azo-bis-isobutyrodini-trile).

The considerable heat of polymerization of (meth)acrylates may be kept under control by corresponding dilution with solvents, by reflux cooling or by inflow regulation. The inflow process is particularly preferred for the preparation of the graft bases because specific influencing of the monomer and initiator concentrations gives more uniform products in high final conversions.

(Meth)acrylate monomers preferably corresponding to general formula (III)

in which
R$_3$=hydrogen or methyl and
R$_2$=H, C$_{1-12}$ alkyl, C$_{5-6}$ cycloalkyl, C$_{9-15}$ aralkyl or C$_{9-15}$ alkyl aryl, are used for the preparation of the graft bases.

The acrylates containing C$_{4-8}$ alkyl radicals are preferably used.

Suitable (meth)acrylates corresponding to general formula (III) are known and commercially available and include, for example, ethyl acrylate, propyl acrylate, butyl acrylate, 2-ethyl hexyl acrtylate, ehtyl methacrylate, butyl methacrylate and 2-ethyl hexyl acrylate. Butyl acrylate and butyl methacrylate are preferred.

The polymerization time depends on the percentage content of comonomers corresponding to formula (I) and the desired molecular weight o the vinyl copolymer graft base. For a high desired molecular weight of the graft base and, at th same time, a high percentage content of compounds corresponding to formula (I), the polymerization time will be correspondingly longer than for a low desired molecular weight of the graft base and/or a low percentage content of compounds corresponding to formula (I).

The resulting, still ungrafted copolymers thus preferably consist of bifunctional structural units corresponding to formula (IV)

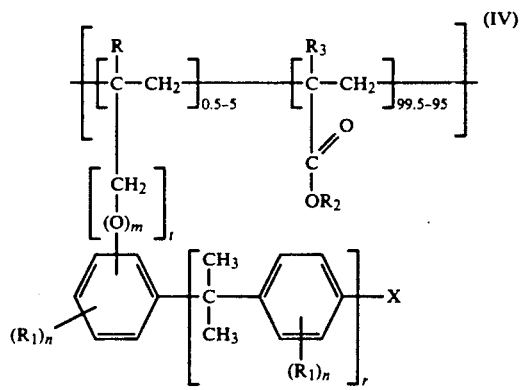

in which
R, R$_1$, m, n, r, t and X are as defined for formula (I) while
R$_2$=H, C$_{1-2}$ alkyl, c$_{5-6}$ cycloalkyl, C$_{9-15}$ arylalkyl or C$_{9-15}$ alkylaryl and R$_3$ is H or methyl.

Diphenols suitable for the grafting reaction are the diphenols typically used or the known production of thermoplastic polycarbonates, preferably those corresponding to formula (V) HO—D—OH, in which D is a two-bond organic radical containing 6 to 45 carbon atoms, and more preferably those corresponding to formulae (II) and (IIa); in (IIa), the R's of the Si-containing heterosegments do not fall under the number of C atoms of —D—.

Examples of suitable diphenols are, for example, 2,2-bis-(4-hydroxyphenl)-propane, 1,2-bis-(3,5-dimethyl-4-hydroxyphenyl)-propane, 1,1-bis-(4-hydroxyphenyl)-cyclohexane, 1,1-bis-(4-hydroxypehnyl)-3,3,5-trimetyl cyclohexane according to German patent application P 38 32 396 (Le A 26 344) and, in addition, polydialkyl siloxane diphenols of the type mentioned in the following under formula (IIa).

The graft side chains may contain one or more diphenols in co-condensed form. It is mentioned in this regard that the diphenols corresponding to formula (IIa) are contained in the side chains in a quantity of at most 20% by weight, based on the total weight of the polycarbonate side chains.

Suitable monophenols of the chain terminators are, for example, phenol, p-tert.-butylphenol, p-cumylphenol and p-isooctylphenol.

Inert organic solvents for the grafting reaction are, for example, methylene chloride and chlorobenzene.

The quantity by weight of inert solvent is about 20 to 25 times the quantity by weight of graft base used in the grafting reaction. The quantity of solvent is determined by the particular quantity by weight of graft base used in the graft to be produced. For a small quantity of graft base, a small quantity of solvent is sufficient, a relatively large quantity of graft base in the graft necessitating a relatively large quantity of solvent. The quantity of solvent should of course be selected so that the final viscosity obtained falls within the range mentioned a the beginning.

Aqueous sodium hydroxide or aqueous potassium hydroxide for example is used as the aqueous alkaline phase.

Suitable catalysts are, for example, tertiary amines such as, for example, triethylamine or N-ethyl piperidine.

The resulting, grafted copolymers thus preferably contain structural units corresponding to formula (IVa) which correspond to the structural units of formula (IV), but in which

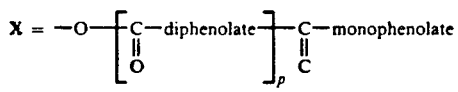

in which p is an integer of 35 to 70 and diphenolate or

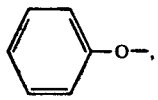

which result naturally from the reaction with phosgene in aqueous alkaline phase, i.e. are residues formed by removal of the phenolic H atoms from diphenols or monompehnols.

In the grafting reaction according to the invention, it is left open whether all the graft sites X of the graft base (IV) participate in the grafting reaction; polycarbonate may optionally accumulate in small quantities.

The polycarbonates to be used as component A) are known as such or may be obtained by known methods (see H. Schnell "Chemistry and Physics of Polycarbonates", Interscience Publishers, NY, 1964) or are the subject of German patent applications P 38 32 396 (Le A 26 344) and P 38 42 931.4 (Le A 26 318).

Polycarbonates based on the diphenols corresponding to formula (II) are those which contain at least 80% by weight, based on the total mols diphenols to be used, of dipehnols corresponding to formula (II) in co-condensed form.

Preferred other diphenols, which are used in quantities of at most 20% by weight, based on the total mols diphenols to be used, are those corresponding to formula (IIa) (cf. for example EP-0 122 535):

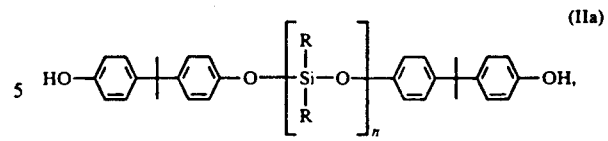

in which
R = $C_{1-4}$ alkyl, preferably $CH_3$—and
n = 20 to 20 and preferably 40 to 80.

Preferred diphenols corresponding to formula (II) are 2,2-bis-(4-hydroxyphenyl)-propane, 1,1-bis-(4-hydroxyphenyl)-cyclohexane and 1,1-bis-(4-hydroxypehnyl)-3,3,5-trimethyl cyclohexane according to German patent application P 38 32 396 (Le A 26 344).

Suitable diphenols corresponding to formula (IIa) are for example those corresponding to formula (IIb)

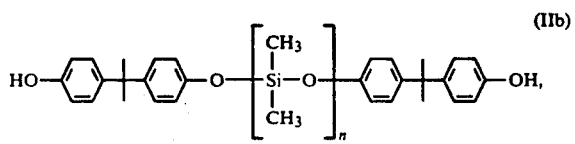

in which
n = 40, 60 or 80.

Suitable chain terminators for the preparation of the polycarbonates of component A) are, for example, phenol, p-tert.-butylphenol and p-isooctylphenol.

The polycarbonates of component A) are both homopolycarbonates and also copoycarbonates.

The aromatic polycarbonates of component A) may be both linear and also branched.

Branching may be carried out in known manner by the incorporation of small quantities, preferably between 0.05 and 2.0 mol-%, based on diphenols used, of trifunctional or more than trifunctional compounds, for example those containing three or more than three phenolic hydroxy groups.

Polycarbonates such as these are known (cf. for example DE-PS 2 500 092 or U.S. Pat. No. 4,185,009).

Some of the compounds containing three or more than three phenolic hydroxy groups suitable for use in accordance with the invention are, for example, phloroglucino1,4,6-dimethyl-2,4,7-tri-(4-hydroxyphenyl)-heptane, 1,3,5-tri-(4-hydroxyphenyl)-benzene, 1,1,1-tri-(4-hydroxy-phenyl)-ethane, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4'-dihydroxytriphenylmethyl)-benzene. Some of the other trifunctional compounds are 2,4-dihydroxybenzoic acid, trimetic acid, cyanuric chloride and 3,3-bis-(4-hydroxy-3-methylphenyl)-2-oxo-2,3-dihydroindole.

It is possible to use both a single polycarbonate and also a mixture of various polycarbonates as component A).

To prepare the mixtures according to the invention, the polycarbonate component and the graft copolymer component may be mixed above the softening temperature of the polycarbonate component used. This may be done, for example, in a single operation by compounding during extrusion in standard screw extruders, for example at temperatures in the range from 80° to 350° C. Known machines, such as twin-screw extruders are preferably used for compounding.

In addition, the polycarbonates and the grafted vinyl polymers according to the invention may also be mixed via the solution and by subsequent co-evaporation in an extruder.

Accordingly, the present invention also relates to a process for the production of the mixtures according to the invention of thermoplastic polycarbonates and the grafted vinyl copolymers according to the invention, characterized in that the polycarbonate component and the graft copolymer component are mixed above the softening temperature of the polycarbonate component used or solutions of the polycarbonate component are mixed with solutions of the graft copolymer component and the resulting mixture is subsequently freed from the solvent in known manner by evaporation.

A suitable solvent for the polycarbonate component is, for example, $CH_2Cl_2$ while a suitable solvent for the graft copolymer component is, for example, methylene chloride or chlorobenzene.

The preferred method of production for the polycarbonate/graft copolymer blends in the in situ process. In this process, the quantity of graft base of structural units corresponding to formula required to generate the desired graft component of the blend is introduced into the polycarbonate synthesis, the effect of the backbone having to be included as it were as a high molecular weight chain terminator in the relevant calculations. The blends directly obtained in this way without intermediate isolation of the grafted vinyl copolymers and without an additional compounding step show the same properties as the blends of polycarbonate of component A and grafted vinyl copolymer containing structural units corresponding to formula (IVa) of component B) of the mixtures according to the invention obtained by compounding in the melt or in solution.

Accordingly, the present invention also relates to a process for the production of the mixtures according to the invention of the thermoplastic polycarbonates of component A) and the grafted vinyl copolymers according to the invention of component B), characterized in that the polycarbonate component and the graft copolymer component are prepared together by the known interfacial process from diphenols, phosgene and chain terminators in the presence of the desired quantity of graft base containing structural units corresponding to formula (IV), the molar ratio of copolymerized compound corresponding to formula (I) in the graft base (IV) to monomeric, conventional phenolic chain terminator having to be selected so that at least 50% of the quantity of chain terminator required to limit the growth of the polycarbonate chain to 35 to 70 recurring structural units

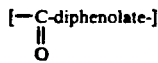

is of conventional type.

The pre-isolation of the ungrafted copolymers containing structural units corresponding to formula (IV) required for this process is achieved by concentration of the reaction solution by evaporation.

Where chlorobenzene is used as reaction medium for the production of the ungrafted copolymers containing structural units corresponding to formula (IV), the reaction solutions may be directly introduced into the interfacial reaction.

It is obvious that, if necessary, the stabilizer systems and/or mold release agents typical of polycarbonate or poly(meth)acrylates may be used for polymer mixtures of the type in question, being incorporated in known manner by compounding as described above.

Examples of the production of graft polymers

EXAMPLE 1 a) Graft base obtained by copolymerization of 4190 g butyl acrylate and 32.0 g (0.47 mol) 4-trimethylsiloxy-α-methylstyrene in solution in 10 l chlorobenzene in the presence of 1 g α,α'-azodiisobutyronitrile in a nitrogen atmosphere over a period of 80 h at 80° C. and separation of the solvent by distillation in a water jet vacuum. The average molecular weight (Mn) determined by gel permeation chromatography was 13,389 g/mol.

b) Grafting reaction 1.35 kg (13.5 mol) phosene were introduced with stirring over a period of 1 hour at 20 to 25° C. into a mixture of 2.28 kg (10 mol) 2,2-bis-(4-hydroxyphenyl)-propane (BPA), 45 g 3 mol-%, based on BPA) p-tert.-butylphenol, 4 kg sodium hydroxide (w=45%), 40 l water, 12 kg chlorobenzene and 2,000 g (=45% by weight, based on Pn of polycarbonate) of the graft base described under a) (w=100%) dissolved in 37.2 kgmethylenechloride. 14 ml (1 mol-%, based on BPA) N-ethyl piperdine are then added, followed by stirring for 1 hour. The organic phase is separated off, washed until free from electrolyte and, after removal of the methylene chloride by distillation, is extruded at 280° C. 6.2 kg product having a relative solution viscosity $\eta_{rel}$ of 1.190 were obtained. The calculated molecular weight (Mn) of the polycarbonate site chains/graft site is 14,182 g/mol, corresponding to a degree of polycondensation p of 56.73.

EXAMPLE 2 a) Graft base obtained by copolymerization of 4036 g butyl acrylate and 74 g 4-trimethylsiloxy-o-methyl styrene (1.13 mol) in solution in 10 l chlorobenzene in the presence of 1 g αα'-azo-diisobutyronitrile in a nitrogen atmosphere over a period of 8 h at the temperature 80° C. The average molecular weight (Mn), as determined by gel permeation chromatography, 672 g/mol.

b) Grafting reaction 1.35 kg (13.5 mol) phosgene are introduced with stirring over a period of 1 hour at 20° to 25° C. into a mixture of 2.28 kg (10 mol) 2,2-bis-(4-hydroxyphenyl)-propane (BPA), 45 g (=3mol-%, based on BPA) p-tert.-butyl-phenol, 4 kg sodium hydroxide (w=45%), 40 l water, 12 kg chlorobenzene and 706.9 g (4% by weight, based on Pn of polycarbonate) of the graft base described under a) (w=29%) dissolved in 37.2 kg methylene chloride. 14 ml (=1 mol-%, based on BPA) N=ethyl piperdine are then added, followed by stirring for 1hour. The organic phase is separated off, washed unit free from electrolyte and, after distillation of the methylene chloride, is extruded at 280° C. 4.76 kg product having a relative solution viscosity $\eta_{rel}$ of 1.326 are obtained. The calculated molecular weight (Mn) of the polycarbonate side chains/graft site is 15,564 g/mol, corresponding lo a degree of polycondensation p of 56.73.

Production of blends

EXAMPLE 3

91.1 Parts of a polycarbonate (PC) of bisphenol A having a relative solution viscosity $\eta_{rel}$ of 1.290 (as measured in methylene chloride at 25° C., concentration 5 g/l) and 8.9 parts of the graft polymer (corresponding to 4 parts butyl acrylate backbone) of Example 1 were mixed by compounding at 270°-290° C. in a ZSK 32.

EXAMPLE 4

As in Example 3, but with 8.9 parts of the graft copolymer of Example 2 (corresponds to 4 parts butyl acrylate backbone).

EXAMPLE 5 a) Graft base obtained by copolymerization of 838 g butyl acrylate and 6.4 g 4-trimethylsiloxy-α-mthylstyrene (0.47 mol-%) in solution in 2 l chlorobenzene in the presence of 2 g α,α'-azodiisobutyronitrile in a nitrogen atmosphere over a period of 14 h at 60° C., 8 h at 80° C., 9 h at 100° C. and 8.5 h at 120° C.

The average molecular weight (Mn), as determined by gel permeation chromatography, was 18,471 g/mol.

b) Production of blend in L=situ 2.7 kg (27 mol) phosgene are introduced with stirring over a period of 1 hour at 20 to 25° C. into a mixture of 4.56 g (20 mol) 2,2-bis-(4-hydroxyphenyl)-propane (BPA), 102 g (=3.4 mol-%, based on BPA) p-tert.-butylphenol, 8 kg sodium hydroxide (w=45%), 40 l water, 12 kg Chlorobenzene and 1145.95 g (=4% by weight, based on Pn of polycarbonate) of the graft base described under a) (w=18.5%) dissolved in 37.2 kg methylenechloride. 28 ml (=1 mol-%, based on BPA) N-ethyl piperdine are then added, followed by stirring for 1 hour. The organic phase is separated off, washed until free from lectrolyte and, after removal of the methylene chloride by distillation, is extruded at 280° C. 3.7 kg product having a relative solution viscosity $\eta_{rel}$ of 1.292 were obtained. The calculated molecular weight (Mn) of the polycarbonate size chains/graft site is 13,142 g/mol, corresponding to a degree of polycondensation p of 51.74.

EXAMPLE 6 a) Graft base obtained by copolymerization of 2,000 g butyl acrylate and 1.2 g 4-trimethylsiloxy-α-methylstyrene (1.57 mol-%) in solution in 2 l chlorobenzene in the presence of α,α',-azo-diisobutyronitrile in a nitrogen atmosphere over a period of 8 h at a temperature of 80° C. The average molecular weight (Mn), as determined by gel permeation chromatography, was 16,756 g/mol.

b) Production of blend in situ 2.7 kg (27 mol) phosgene are introduced with stirring over a period of 1 hour at 20° to 25° C. into a mixture of 4.56 kg (20 mol) 2,2-bis-(4-hydroxyphenyl)-propane (BPA), 90 g (=3 mol-%, based on BPA) p-tert.-butylphenol, 8 kg sodium hydroxide (w=45%), 0 l water, 12 kg chlorobenzene and 398 g (=4% by weight, based on Pn of polycarbonate) of the graft base described under a) (w=51.05%) dissolved in 37.2 kg methylene chloride.

28 ml (=1 mol-%, based on BPA) N-ethyl piperdine are then added, followed by stirring for 1 hour. The organic phase is separated off, washed until free from electrolyte and, after removal of the methylene chloride by distillation, is extruded at 280° C. 4.185 kg product having a relative solution viscosity $\eta_{rel}$ of 1.336 were obtained. The calculated molecular weight (Mn) of the polycarbonate side chains/graft site is 15,714 g/mol, corresponding to a degree of polycondensation p of 61.86.

EXAMPLE 7 a) Graft base obtained by copolymerization of 838 g butyl acrylate and 6.4 g 4-trimethylsiloxy-α-methylstyrene (0.47%) in the presence of 2 g α,α'-azodiisobutyronitrile which is introduced over a period of 3 h at 70° C. into 2 l chlorobenzene and continues reacting for 4 h at 70° C. until a viscosity (as measured in a 4 mm Ford cup) of 70 seconds is obtained. The average molecular weight (Mn), as determined by gel permeation chromatography, was 16,608 g/mol.

b) Production of blend in situ 2.7 kg (27 mol) phosgene are introduced with stirring over a period of 1 hour at 20° to 25° C. into a mixture of 4.56 g (20 mol) 2,2-bis-(4hydroxyphenyl)-propane (BPA), 102.7 g (=3.4 mol-%, based in BPA) p-tert.-butylphenol, 8 kg sodium hydroxide (w=45), 40 l water, 12 kg chlorobenzene and 707 g (=4% by weight, based on Pn of polycarbonate) of the graft base described under a) (w=28.7%) dissolved in 30 kg methylene chloride. 28 ml (=1 mol-%, based on BPA) N-ethyl piperdine are then added, followed by stirring for 1 hour. The organic phase is separated off, washed until free from electrolyte and, after removal of the methylene chloride by distillation, is extruded at 280° C. 4.36 kg product having a relative solution viscosity $\eta_{rel}$ of 1.327 were obtained. The calculated molecular weight (Mn) of the polycarbonate side chains/graft site is 13,932 g/mol, corresponding to a degree of polycondensation p of 54.85.

To determine resistance to gasoline, test specimens measuring 80 mm×10 mm×4 mm were prepared and clamped in bending templates having different radii of curvature in such a way that outer fiber strains $\epsilon_R$ of 0.3% and 1.0% were obtained. The templates and test specimens were stored for 15 minutes at 70° C. in a healing cabinet (with forced air circulation according to DIN50 011, 2, 3).

The templates and test specimens were removed from the cabinet and a cotton wool plug impregnated with a test fuel was applied to the test specimens immediately afterwards. A test gasoline according to DIN 51 604 consisting of 50% by volume toluene, 30% by volume isooctane, 15% by volume diisobutylene and 5% by volume ethanol was used as the test fuel. After a contact time if 15 minutes, the cotton wool plug was removed and the test specimen left to air for another 15 minutes.

The test specimens were then evaluated with the naked eye as follows:

| Stage | Feature |
| --- | --- |
| 1 | no visible change |
| 2 | surface dulled |
| 3 | fine cracks |

| Stage | Feature |
|---|---|
| 4 | large cracks, failure |

The improved impact strength was also determined on test specimens measuring 80 mm×10 mm×4 mm. Izod notched impact strength ($a_k$) was determined in accordance with ISO 180/1A. The results of the performance tests are shown in the following Table, a polycarbonate having an ηhd rel value of 1.290 (* a Pn of 55.5) being used for comparison.

| Property | Melt compounding | in situ blend preparation |
|---|---|---|

| $a_k$ (kJ/m²) | PC | Ex. 3 | Ex. 4 | Ex. 5 | Ex. 6 | Ex. 7 |
|---|---|---|---|---|---|---|
| +23° C. | 802 | 707 | 748 | 743 | 789 | 657 |
| +0° C. | 348 | 656 | 720 | 743 | 779 | 629 |
| −10° C. | 226 | 367 | 706 | 288 | 732 | 309 |
| −20° C. | — | 239 | 695 | 217 | 726 | 236 |
| −30° C. | — | — | 243 | — | 268 | — |
| −40° C. | — | — | — | — | — | — |
| 1st Cycle | | | | | | |
| E = 0.3% | 4 | 2 | 2 | 2 | 2 | 2 |
| E = 1.0% | — | 2 | 4 | 2 | 4 | 2 |
| 2nd Cycle | | | | | | |
| E = 0.3% | — | 2 | — | 2 | — | 2 |
| E = 1.0% | — | 2 | — | 2 | — | 4 |

We claim:

1. A graft vinyl copolymer having grafted-on polycarbonate chains prepared by first copolymerizing by radically initiated polymerization a vinyl copolymer graft base having a number average molecular weight of 10,000 to 40,000 as determined by gel permeation chromatography, containing about 95 to 99.5 mol-% of (meth)acrylate and 5 to 0.5 mol-% of compounds corresponding to

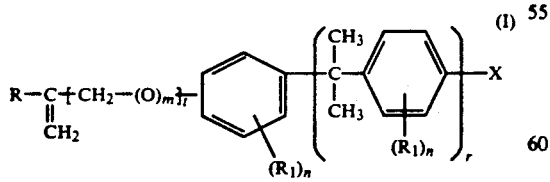
(I)

wherein R denotes H or $C_{1-4}$ alkyl, $R_1$ is Cl, Br, $C_{1-4}$ alkyl, cyclohexyl or $C_{1-4}$ alkoxy, m is 0 or 1, n denotes 0, 1 or 2, r is 0 or 1, t is 0 or 1 and X = —O—Si(CH$_3$)$_3$, and then reacting the resulting copolymer with at least one diphenol, phosgene and at least one monophenol in aqueous-alkaline phase in the presence of an inert organic solvent under the conditions of the two phase interfacial process to form polycarbonate chains grafted onto said graft base, the quantity of said diphenol being selected so that the resulting polycarbonate chains amount to between 675 and 45 percent relative to the weight of said graft vinyl copolymer and the quantity of said monophenol being gauged to yield a degree of polymerization of said chains of about 35 to 70 and the quantity of said inert organic solvent being selected to render the final viscosity of the organic phase o the reaction mixture between 5 and 25 mPa.s, said reacting being carried out without isolation of said graft base.

2. A grafted vinyl copolymer according to claim 1 characterized in that it contains structural units corresponding to formula (IVa)

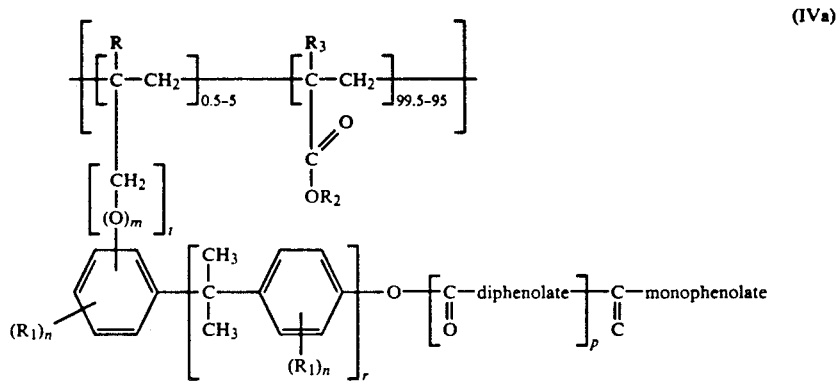
(IVa)

in which R, $R_1$, m, n, r and t are as defined for formula I in claim 1, p is an integer of 35 to 70 and diphenolate and monophenolate are residues formed by removal of the pehnolic H atoms from diphenols and monophenols and in which $R_2$ is H, $C_{1-12}$ alkyl, $C_{5-6}$ cycloalkyl, $C_{9-15}$ aralkyl or $C_{9-15}$ alkaryl and $R_3$ is H or methyl.

3. A thermoplastic molding composition comprising a mixture of
A) 99.5 to 70% by weight, of a thermoplastic, aromatic polycarbonate based on diphenols corresponding to formula (II)

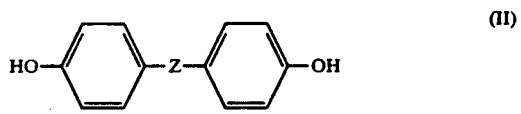
(II)

in which Z is a single bond, an alkylene radical containing 1 to 8 carbon atoms, an alkylidene radical containing 2 to 12 carbon toms, a cyclohexylidene radical, a 3,3,5-trimethyl cyclohexylidene radical, a benzylidene radical, a methyl benzylidene radical, a bis-(phenyl)-methylene radical, —S—, —SO$_2$—, —CO—or —O—, having $M_w$ (weight average molecular weights as determined in known manner via the relative solution viscosity) in the range from 15,000 to 120,000 and
B) 0.5 to 35% by weight based on 100% by weight of said A) +B) of a the graft vinyl copolymer of claim 2.

4. A thermoplastic molding composition comprising a mixture of

A) 99.5 to 70% by weight, of a thermoplastic, aromatic polycarbonate based on diphenols correspond to formula (II)

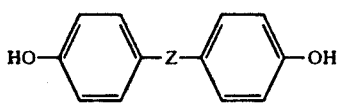

in which Z is a single bond, an alkylene radical containing 1 to 8 carbon atoms, an alkylidene radical containing 2 to 12 carbon atoms, a cyclohexylidene radical 3,3,5-trimethyl cyclohexylidene radical, a benzylidene radical, a methyl benzylidene radical, a bis-(phenyl)-methyl radical, —S—, —SO$_2$—, —CO— or —O—, having M$_w$ (weight average molecular weights as determined in known manner via the relative solution viscosity) in the range from 15,000 to 120,000, and B) 0.5 to 30% by weight based on 100% by weight of said A) +B) of a graft vinyl copolymer having grafted-on polycarbonate chains prepared by first copolymerizing by radically initiated polymerization a vinyl copolymers graft base having a number average molecular weight of 10,000 to 40,000 as determined by gel permeation chromatography, containing about 95 to 99.5 mol-% of (meth)acrylate and 5 to 0.5 mol-% of compounds corresponding to

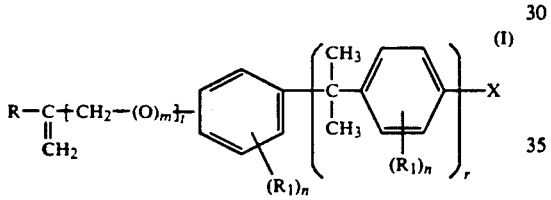

wherein R denotes H or C$_{1-4}$ alkyl, R$_1$ is Cl, Br, C$_{1-4}$ alkyl, cyclohexyl or C$_{1-4}$ alkoxy, m is 0 or 1, n denotes 0, 1 or 2, r is 0 or 1, t is 0 or 1 and X=—O—Si(CH$_3$)$_3$, and then reacting the resulting copolymer with at lest one diphenol, phosgene and at least one monophenol is aqueous-alkaline phase in the presence of an inert organic solvent under the conditions of the two phase interfacial process to form polycarbonate chains grafted onto said graft base, the quantity of said diphenol being selected so that the resulting polycarbonate chains amount to between 65 and 45 percent relative to the weight of said graft vinyl copolymer and the quantity of said monophenol being gauged to yield a degree of polymerization of said chains of about 35 to 70 and the quantity of said inert organic solvent being selected to render the final viscosity of the organic phase of the reaction mixture between 5 and 25 mPa.s, said reacting being carried out without isolation of said graft base.

5. A process for the production of a molding composition containing a thermoplastic polycarbonate and grafted vinyl copolymer, said copolymer having a vinyl copolymer graft base and polycarbonate chains grafted thereon and wherein said base has a number average molecular weight, as determined by gel permeation chromatography, of about 10,000 to 40,000 and wherein said chains have a degree of polycondensation of 35 to 70 and wherein the weight ratio of graft base to said chains is about 35:65 to 55:45 comprising preparing by radically initiated polymerization a grafted vinyl copolymer from 95 to 99.5 mol-% (meth)acrylate and 5 to 0.5 mol-% of a compound corresponding to

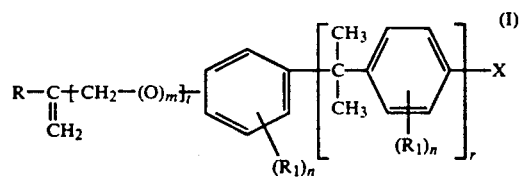

in which R is H or C$_{1-4}$ alkyl,
R$^1$ is Cl, Br, C$_{1-4}$ alkyl, cyclohexyl or C$_{1-4}$ alkoxy,
m is 0 or 1
n is 0, 1 or 2,
r is 0 or 1,
t is 0 or 1,
X denotes —O—Si(CH$_3$)$_3$, and without isolation reacting said copolymer graft base with at least one diphenol, at least one monomophenolic chain terminator and phosgene, in an aqueous alkaline phase in the presence of an inert organic solvent under the conditions of the interfacial process, to produce said grafted chains, the quantity of said diphenol being determined such that the weight of said polycarbonate chains is about 45 to 65% relative to the weight of said grafted vinyl copolymer and wherein the quantity of said chain terminator is such that said chains contain about 35 to 70 recurring carbonate structural units and the quantity of said organic solvent is selected so that the final viscosity of the organic phase of the mixture containing said solvent, polycarbonate and graft copolymer is about 5 to 25 mPa.s, said process being further characterized in that said polycarbonate and said graft copolymer are prepared together in the presence of a graft base corresponding to

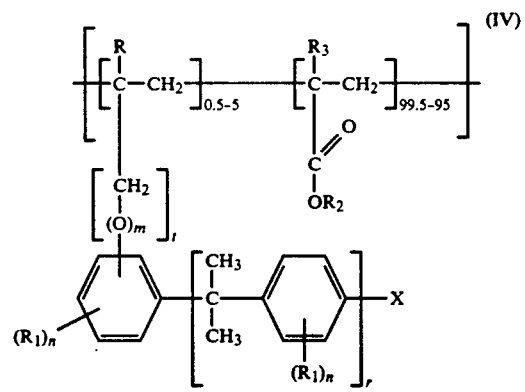

wherein R, R$_1$, m, n, r, t and X are as defined above and where R$_2$ is H, C$_{1-12}$ alkyl, C$_{5-6}$ cycloalkyl, C$_{9-15}$ arylalkyl or C$_{9-15}$ alkylaryl, and R$_3$ is H or methyl, wherein the molar ratio of said (I) in said graft base (IV) to said monomeric chain terminator is selected so that at least 50% of the quantity of said chain terminator required to limit the growth of the polycarbonate chain to 35 to 70 recurring structural units

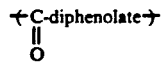

is of conventional type.

* * * * *